(12) United States Patent
Coetzer

(10) Patent No.: US 6,428,585 B1
(45) Date of Patent: Aug. 6, 2002

(54) ELECTROCHEMICAL CELL SEPARATOR

(75) Inventor: Johan Coetzer, Pretoria (ZA)

(73) Assignee: Bi-Patent Holdings, S.A. (LU)

( * ) Notice: Subject to any disclaimer, the term of this patent is extended or adjusted under 35 U.S.C. 154(b) by 0 days.

(21) Appl. No.: 09/640,827

(22) Filed: Aug. 16, 2000

(30) Foreign Application Priority Data

Aug. 25, 1999 (ZA) ............................................. 99/5452

(51) Int. Cl.⁷ ............................................. B28B 21/52
(52) U.S. Cl. ..................... 29/623.2; 29/623.1; 264/629; 264/630; 264/177.11; 264/209.3; 264/296
(58) Field of Search ................. 264/629, 630, 264/177.11, 209.3, 296; 29/623.2, 623.1

(56) References Cited

U.S. PATENT DOCUMENTS

| | | | |
|---|---|---|---|
| 3,607,435 A | * | 9/1971 | Charles |
| 3,790,654 A | * | 2/1974 | Bagley .................. 264/177.11 |
| 4,279,974 A | | 7/1981 | Nishio ........................ 429/104 |
| 4,568,502 A | | 2/1986 | Theodore et al. ............. 264/63 |
| 5,051,324 A | | 9/1991 | Bones et al. ................. 429/193 |
| 5,057,384 A | | 10/1991 | Bones et al. ................. 429/104 |
| 5,188,779 A | * | 2/1993 | Horikawa et al. ........... 264/630 |
| 5,230,968 A | | 7/1993 | Bones et al. ................. 429/191 |
| 6,007,943 A | | 12/1999 | Coetzer ....................... 429/104 |
| 6,294,128 B1 | * | 9/2001 | Crasbie ....................... 264/634 |

FOREIGN PATENT DOCUMENTS

| | | | |
|---|---|---|---|
| GB | 2231567 | | 11/1990 |
| GB | 2281561 | | 3/1995 |
| WO | WO 98/35400 | * | 8/1998 |

* cited by examiner

Primary Examiner—James Derrington
(74) Attorney, Agent, or Firm—Fulbright & Jaworski L.L.P.

(57) ABSTRACT

The invention provides a method of making a ceramic solid electrolyte separator for a high temperature electrochemical cell from a particulate starting material capable of being sintered to form a unitary polycrystalline solid electrolyte ceramic artifact. The method includes admixing the particulate starting material with a binder to form an extrudable mixture, extruding the mixture to form a unitary sinterable green artifact including a multiplicity of at least five tubes interconnected together in side-by-side relationship and sintering the green artifact to form a sintered polycrystalline ceramic solid electrolyte artifact. The artifact includes a multiplicity of at least five ceramic solid electrolyte separator tubes interconnected together by sintering and arranged in side-by-side relationship.

6 Claims, 3 Drawing Sheets

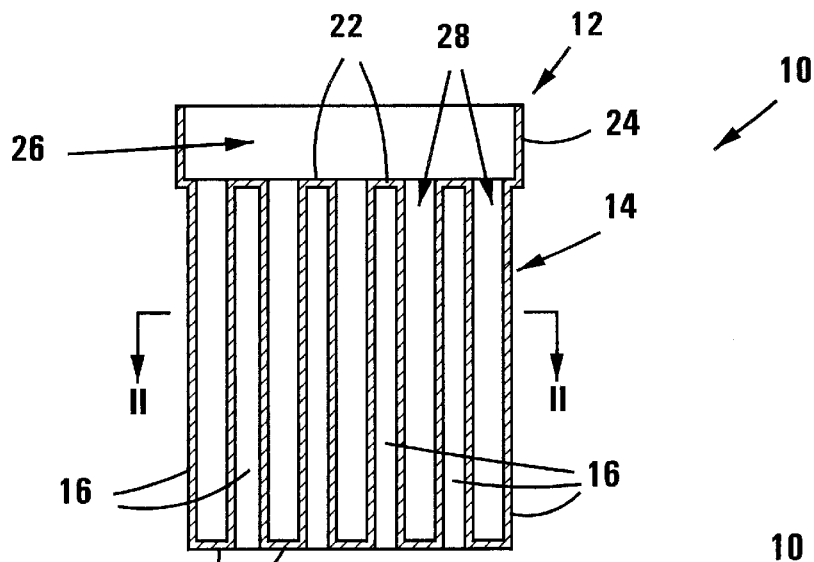
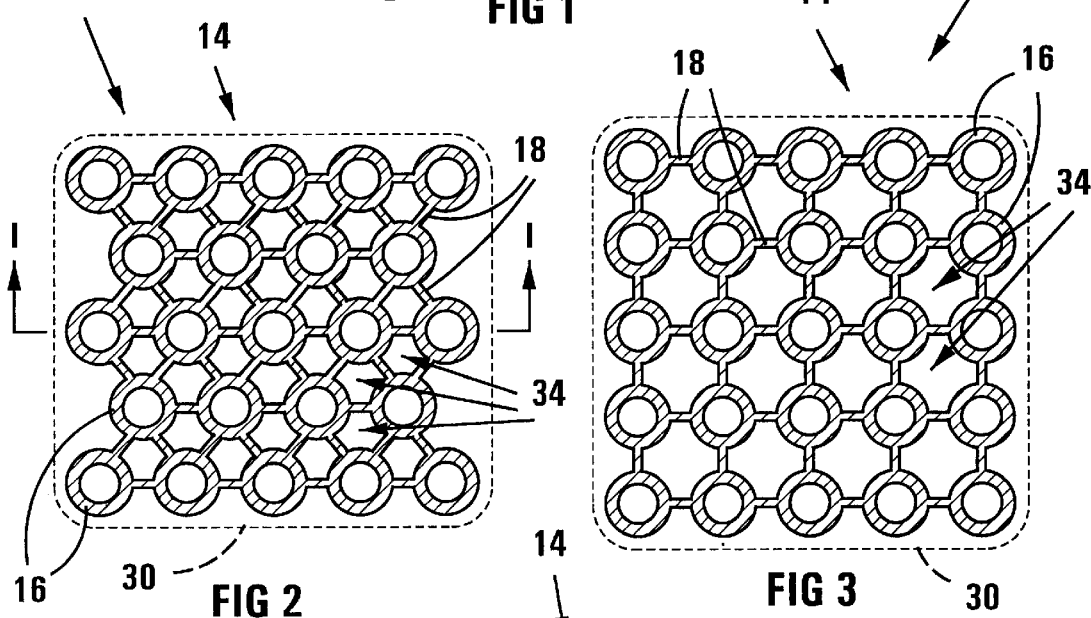
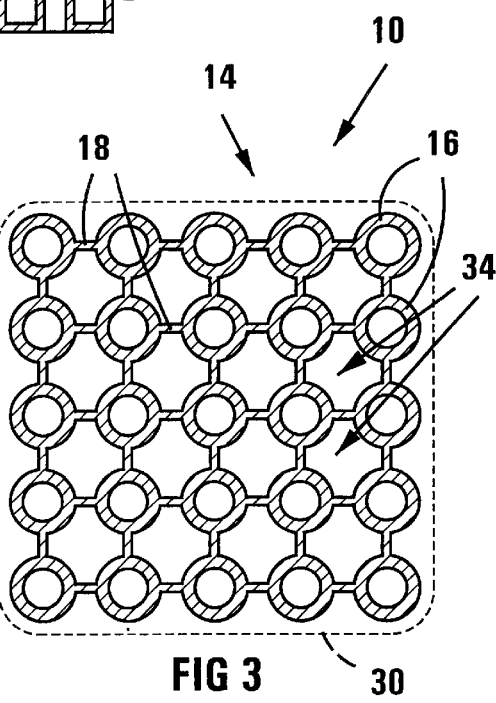
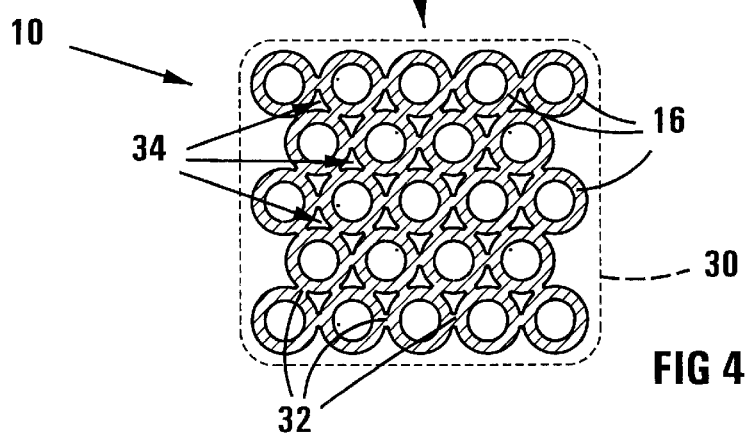
FIG 1
FIG 2
FIG 3
FIG 4

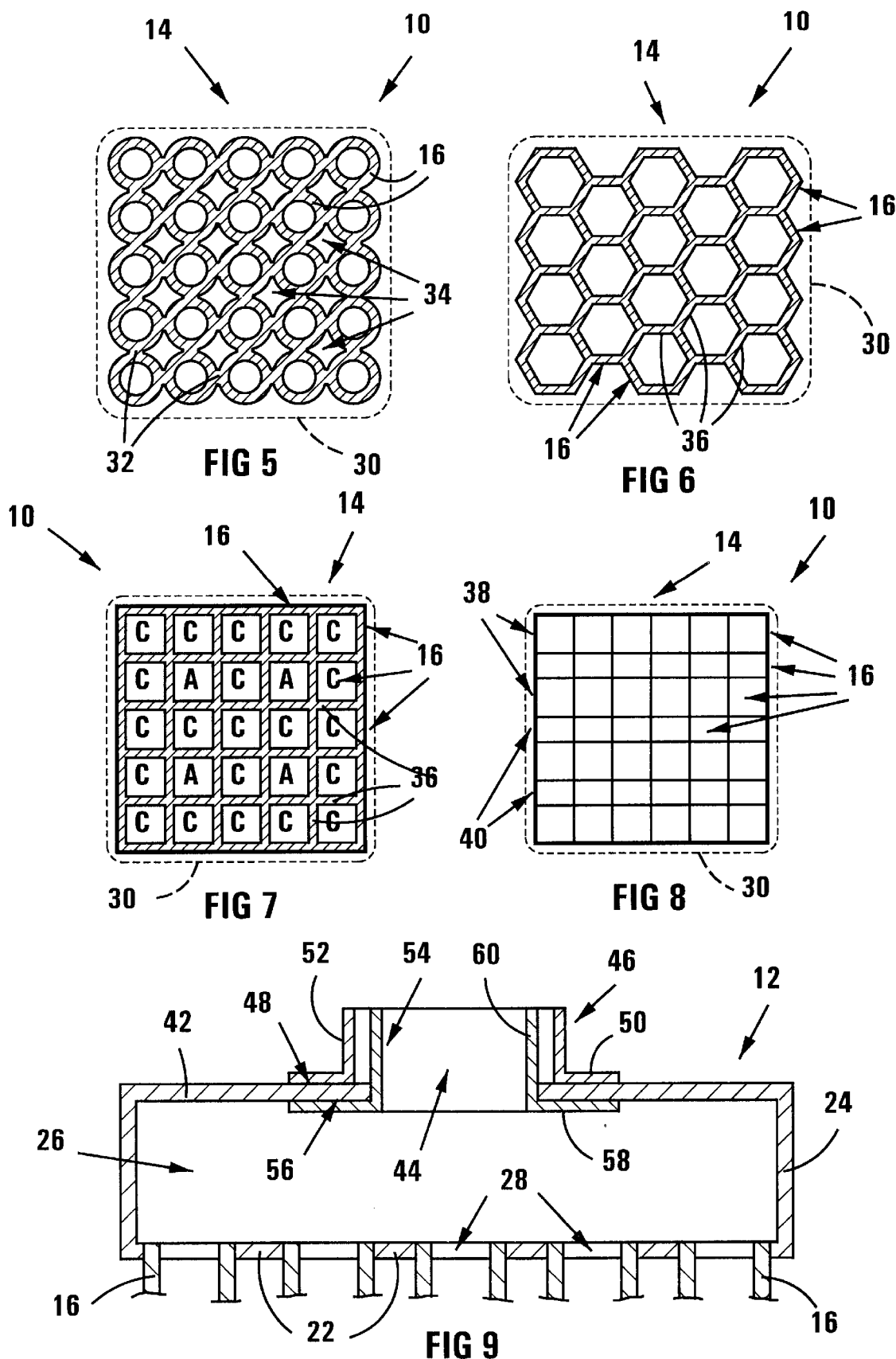

ELECTROCHEMICAL CELL SEPARATOR

THIS INVENTION relates, broadly, to a separator for a high temperature rechargeable electrochemical cell. More particularly, the invention relates to a method of making such separator.

According to the invention there is provided a method of making a ceramic solid electrolyte separator for a high temperature electrochemical cell from a particulate starting material capable of being sintered to form a unitary polycrystalline solid electrolyte ceramic artifact, the method comprising the method steps of:

admixing the particulate starting material with a binder to form an extrudable mixture;

extruding the extrudable mixture to form a unitary sinterable green artifact including a multiplicity of at least five tubes interconnected together in side-by-side relationship; and sintering the green artifact to form a sintered polycrystalline ceramic solid electrolyte artifact including a multiplicity of at least five ceramic solid electrolyte separator tubes interconnected together by sintering and arranged in side-by-side relationship.

Conveniently the solid electrolyte is a conductor of sodium ions, such as $\beta$-alumina or, preferably, $\beta''$-alumina. The particulate starting material may be in the form of particles of the solid electrolyte material, or it may be in the form of a precursor mixture which, upon heating thereof to sintering temperatures, is converted or transformed to the solid electrolyte material. When the solid electrolyte is to be $\beta$- or $\beta''$-alumina, it may be a powder mixture including a suitable oxide or hydroxide of aluminium, together with soda and a constituent selected from lithia or magnesia, of a type known in the art to form $\beta$- or $\beta''$-alumina when heated to sintering temperatures. Precursors may be used of the alumina oxide, of the soda, of the lithia or of the magnesia, being substances which, when heated in air to a temperature of 700° C., become the oxide in question. In this regard aluminium hydroxide is in fact a precursor of aluminium oxide of this type. In a particular embodiment of the invention, thus, the particulate material may be a precursor of a solid electrolyte selected from the group of solid electrolytes consisting of sodium $\beta$-alumina, sodium $\beta''$-alumina and mixtures thereof, the binder being selected from the group consisting of binders having thermoplastic properties, binders having thermosetting properties, binders having both thermoplastic properties and thermosetting properties, and mixtures of such binders.

The binder may be an organic binder having both thermoplastic properties and thermosetting properties, having thermoplastic properties when initially heated, but when heated to higher temperatures than those at which it is thermoplastic, becoming thermosetting in nature. Suitable binders, in the form of binder formulations, are described, for example, in British Patent GB 1 274 211. As mentioned in GB 1 274 211, a single binder compound may be used, provided that it displays the required thermoplastic and thermosetting properties.

A suitable binder is polyvinyl-butyral, as it has both thermoplastic properties and thermosetting properties, and it may be used together with a plasticizer such as dibutyl phthalate and a solvent such as methylethyl ketone, the solvent and plasticizer facilitating blending of the binder into the particulate starting material such as $\beta$- or $\beta''$-alumina or a precursor mixture thereof, to form a sufficiently homogeneous extrudable mixture. However, if a high energy mixer, such as a Banbury mixer, is used, the plasticizer and solvent can, in principle, be omitted.

In practice the extrusion may be to provide the multiplicity of tubes of the green artifact in what amounts to be a closely-packed side-by-side abutting relationship, in which the peripheries of the tubes abut and are integral with one another, or, instead, the tubes may be spaced from one another in side-by-side relationship by longitudinally extending spacers in the form of webs of extruded material, each web having side edges integral with the peripheries of two adjacent tubes. In this regard, by a multiplicity of tubes is meant, at least 5 tubes, typically at least 10 tubes and preferably at least 25 tubes. Thus, in one embodiment, the extruding may act to provide the tubes of the green artifact in a close-packed side-by-side abutting relationship in which the peripheries of adjacent tubes abut one another and, after the sintering, are integral with one another; and, in another embodiment, the extruding may act to provide the tubes of the green artifact in a mutually spaced side-by-side relationship, the tubes being spaced apart from one another by longitudinally extending spacers in the form of webs of extruded material, each web having side edges integral with the peripheries of two adjacent tubes.

It is contemplated that extrusion will preferably be intermittent, a plurality of green artifacts being successively extruded from a batch of extrudable mixture and detached from the remainder of the batch, for example by being cut or sliced from material of the batch, in a direction transverse to the tubes. Each green artifact will be intended to form, after sintering, a cell separator. Typically a plurality of green artifacts will be extruded from a batch of extrudable mixture. In a particular embodiment, the extruding may be intermittent, being of a plurality of unitary sinterable green artifacts in succession from a batch of the extrudable mixture, a plurality of the green artifacts being sintered simultaneously in a single sintering step.

In use the separator may form part of an assembly comprising a header (for connection of the separator to a cell housing), at least part of which header may be electronically and electrochemically insulating, the header being hermetically connected to the open ends of the tubes, with its interior in communication with the interiors of the tubes for example as described in International Patent Application PCT/GB98/00389 published as WO 98/35400, by glassing, ie glass welding. The sintered separator may thus be glass welded to a suitable header having electronically- and electrochemically insulating properties. The end of the separator opposite or remote from the header will have a plurality of openings leading into the tubes or into spaces between the tubes and extending alongside the tubes, and certain of the tubes will typically be closed off by one or more sintered closures of the same material as the tubes. While, in principle, these closures may be plugs or panels of the solid electrolyte material in question, glass welded to the tubes, it is expected that it will be preferred to form, eg by moulding, the closures simultaneously with the extrusion of each artifact, from the extruded material. Thus, in general, the method may include, after the sintering, hermetically connecting a header to open ends of a plurality of the separator tubes at one end of the separator, the header having an interior in communication with the interiors of these tubes, the hermetic connecting being by glass welding and the header being both of a material which is electronically insulating and electrochemically insulating, and the method further including closing off the ends of a plurality of the separator tubes at the end of the separator remote from the header. In this case, the closing off of the ends of the plurality of tubes at the remote end of the separator may be by moulding the ends of said tubes while they are in a green state, to form closures which close of said ends of the tubes, the moulding taking place, prior to the sintering, while the separator is being extruded.

According to this feature, the downstream ends of the tubes, ie those which emerge or are formed first during the extrusion, may be moulded shut while in plastic and extrudable/mouldable state, during the initial part of the extrusion step. It is contemplated, in this regard, that an extruder having a die with a multiplicity of more or less annular openings or orifices for extruding the tubes may be used, together with a movable mould for moulding said ends of the tubes shut. The mould may have a working face provided with a multiplicity of recesses or indentations, one for each tube, the recesses or indentations being arranged in an arrangement corresponding to the arrangement of the annular orifices in the die, and corresponding to the arrangement of the tubes in the separator.

In use the mould will be placed in a starting position at or closely adjacent the extruder at the start of the extrusion of each separator, the mould being arranged so that the recesses or indentations of the mould register with, and are opposed to, the outlets of the annular orifices of the die, so that the tubes will be extruded respectively into the recesses or indentations, at the start of the extrusion. Extrusion is continued until the material of the mixture entering the recesses or indentations is deformed to close off the downstream ends of the extruded tubes, after which the mould is moved away from the die in the direction of extrusion to permit the remainder of the green artifact comprising the tubes and separator to be extruded, after which the separator is cut or sliced, at or adjacent the die orifice outlets, to detach the separator from the mixture in the extruder. The extrusion in the form of a green artifact is removed, the mould is returned to its starting position and the extrusion/moulding cycle is repeated for the succeeding separator. The extrusions can then be sintered before being glassed to their headers.

In other words, the moulding may be by means of a mould having a multiplicity of recesses, there being a recess for each tube of the green artifact, the mould being aligned with the tubes during the extrusion so that each tube registers with a corresponding one of the recesses, the extrusion of the tubes being into the recesses so that the leading ends of the tubes are received in the recesses and are closed off by being moulded shut by contact with inner surfaces of the recesses; and the tubes may be extruded from a batch of the extrudable mixture into the recesses at the start of each extrusion step, with the mould stationary and located in a starting position until the tubes are moulded shut, the mould then being moved away from the starting position in the direction in which the tubes are extruded, until the tubes are fully extruded, the green artifact then being detached from the unextruded remainder of the batch, and the mould then being returned to the starting position.

The tube arrangements for the separator include rectangular close-packed or rectangular spaced arrangements, and hexagonal close-packed or hexagonal spaced arrangements. The tubes in turn may have various cross-sections, as desired. Thus the tubes may be of circular cross-section, spaces being defined between the tubes, whether the tubes are spaced or close-packed, or the tubes may be square, rectangular or hexagonal in cross-section, in which case they will usually be close-packed with no spaces therebetween, although they may in principle be spaced by spacer webs from one another.

The invention will now be described, by way of example, with reference to the accompanying diagrammatic drawings, in which:

FIG. 1 shows a schematic sectional side elevation, in the direction of line I—I in FIG. 2, of a separator assembly, including a header, made in accordance with the method of the present invention;

FIG. 2 shows a schematic sectional plan view of the assembly of FIG. 1, in the direction of line II—II in FIG. 1;

FIGS. 3–8 show schematic views, corresponding to FIG. 2, of separator assemblies made in accordance with the method of the present invention, having tube arrangements different from that of the assembly of FIGS. 1 and 2, and different from one another;

FIG. 9 shows a detail of the header of the assembly of FIG. 1;

Figure 10:
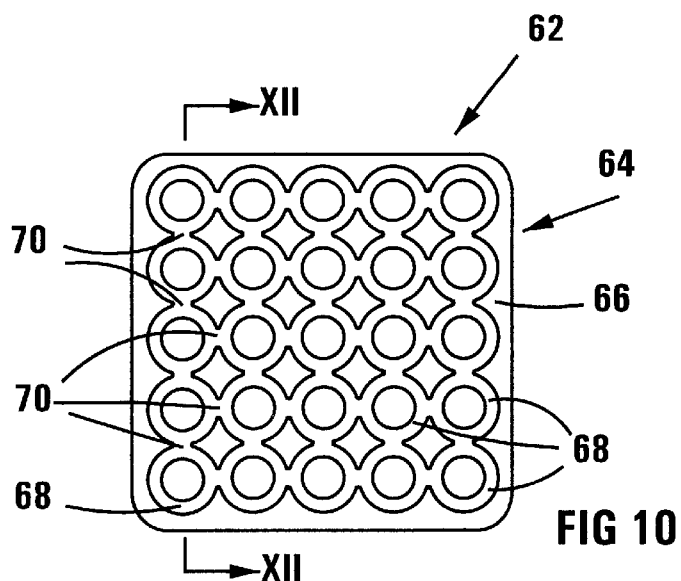
FIG. 10 shows an end elevation of the die of an extruder for extruding the tubes of the assembly of FIG. 5.

In FIGS. 1 and 2 a separator assembly is shown generally designated by reference numeral 10 and comprising a header 12 and a separator, designated 14 and made up of a multiplicity of twenty-three spaced, parallel separator tubes 16 arranged in a spaced hexagonal arrangement. The tubes 16 extend alongside one another and are spaced apart by webs 18. The header 12 is in the form of a cup and is made of α-alumina, and the tubes 16 and webs 18 are made of β"-alumina.

The tubes 16 are circular in cross-sectional outline and have ends remote from the header 12 which are closed by closures 20 in the form of closure panels. The ends of the tubes 16 adjacent the header 12 are open. The cup of the header 12 has a floor 22 and an upstanding peripheral rim or wall 24 enclosing a header space 26 above the tubes 16, the assembly 10 being shown in an upright operative attitude in FIG. 1. The open ends of the tubes 16 open into the header space 26 through openings 28 in the floor 22 of the header 12, with which they are sealingly fast by glass welding. The floor 22 has a rectangular outline, the periphery of which is shown by broken line 30 in FIG. 2. The header 12 has a lid, not shown in FIG. 1, but described in more detail hereunder with reference to FIG. 9.

In FIG. 3 the separator assembly is similar to that of FIGS. 1 and 2, the same reference numerals being used for the same parts in FIG. 3 as in FIG. 2. Differences between the assembly of FIG. 3 and that of FIGS. 1 and 2, are that the assembly of FIG. 3 has twenty-five tubes 16; and, instead of the hexagonal spaced tube arrangement of the assembly of FIGS. 1 and 2, the assembly of FIG. 3 has a rectangular (square) spaced tube arrangement.

Turning to FIG. 4, once again, the same reference numerals are used for the same parts as in FIG. 2. The tube arrangement of FIG. 4 is, like that FIGS. 1 and 2, hexagonal, but, instead of being separated from one another by webs 18, the tubes can be regarded as being in a close-packed hexagonal arrangement. Thus, there are no spacers or webs in FIG. 4 and the tubes 16 are integrally fused to one another where they touch one another at 32.

Turning to FIG. 5, the same reference numerals are used for the same parts as in FIG. 4. The differences between the assembly of FIG. 5 and that of FIG. 4 are that the assembly of FIG. 5 has twenty-five tubes 16 instead of the twenty-three tubes 16 of the assembly of FIG. 4; and, while the tubes 16 are in a close-packed arrangement like that of the tubes of the assembly of FIG. 4, the tube arrangement of FIG. 5 is rectangular, like that of the assembly of FIG. 3, the webs 18 also being omitted from the assembly of FIG. 5, the tubes being fused together at 32.

In the case of the assembly 10 of FIG. 6, broadly, the same reference numerals are used for the same parts, where appropriate, as in FIGS. 2–5. A difference between the tubes 16 of FIG. 6 and the tubes 16 of FIGS. 2–5 is that the tubes 16 of FIG. 6, instead of being of circular cross-sectional outline like those of FIGS. 2–5, are of regular hexagonal outline. Thus, while the tubes 16 of the assemblies 10 of FIGS. 2–5 have longitudinally extending spaces 34 extending alongside them and bounded by the tubes 16 and webs 18 (FIGS. 2 and 3) or simply by the tubes 16 (FIGS. 4 and 5), the tubes 16 in FIG. 6 are in a hexagonal close-packed arrangement in which there are no spaces 34 between the tubes, adjacent tubes having common walls where they abut, as at 36. The assembly 10 of FIG. 6 is shown having eighteen tubes 16.

The assembly 10 of FIG. 7 is similar to that of FIG. 6, and the same reference numerals are used in FIG. 7 as in FIG. 6, unless otherwise specified. Differences between the assemblies of FIGS. 6 and 7 are that there are twenty-five tubes 16 in the assembly of FIG. 7; and FIG. 7 has its tubes 16 arranged in a square close-packed arrangement.

In the case of FIG. 8, a simplified view of a variation of the assembly of FIG. 7 is shown, having thirty-five tubes 16, namely four rows 38 of five larger tubes 16 each, giving twenty larger tubes, and three rows 40 of five smaller tubes each, giving fifteen smaller tubes 16. The larger tubes are of square outline and the smaller tubes are of elongate rectangular outline, the tubes being arranged in a close-packed rectangular arrangement in which the rows of larger tubes alternate with the rows of smaller tubes, the outermost two rows being rows 38 of larger tubes 16.

In FIG. 9 the same reference numerals are used for the same parts as in FIG. 1, unless otherwise specified. The header cup 12 is shown with only the upper ends of the tubes 16 illustrated, and the header cup 12 is shown with a lid 42 having a central opening 44. A metal sealing ring 46 is shown hermetically thermocompression bonded at 48 to the outer (upper) surface of the lid 42, along the periphery of the opening 44. The ring 46 has a radially outwardly projecting circumferentially extending flange 50 which is bonded to the lid 42, and an upstanding rim 52 extending along the inner periphery of the flange 50.

Similarly, a metal sealing ring 54 is hermetically thermocompression bonded at 56 to the inner (lower) surface of the lid 42, along the periphery of the opening 44. The ring 54 has a radially outwardly projecting circumferentially extending flange 58 which is bonded to the lid 42, and an upstanding rim 60, inside and concentric with the opening 44 and with the rim 52 of the ring 46, the rim 60 extending along the inner periphery of the flange 58.

The lid 42, rim 24 and floor 22 of the header 12 are in the form of an integral or unitary sintered moulding of α-alumina, as described in more detail hereunder, glass welded to the β"-alumina tubes 16 of the separator assembly. The open ends of the tubes 16 are glassed into respective openings 28 in the floor 22.

In accordance with the method of the present invention an extrudable mixture is formed, being for example the same as the mouldable mixture described in U.S. Pat. No. 5,057,384, by admixing 80–120 parts by mass of β"-alumina powder having a particle size of 10–50 µm with 14–18 parts by mass of a binder such as the thermoplastic and thermosetting polyvinyl butyral binder of British Patent GB 1 274 211, together with 5–10 parts by mass of a plasticizer such as dibutyl phthalate described in British Patent GB 1 274 211, and the methyl ethyl ketone solvent of GB 1 274 211. The constituents are mixed until a substantially homogeneous mixture is formed. The method also contemplates formulating a second mouldable mixture in which the β"-alumina mentioned above is replaced by the same proportion of α-alumina, the formulation being otherwise the same.

According to the method of the invention the mixtures containing β"-alumina and α-alumina respectively, are used to make separator assemblies according to the invention. An extruder including the die of FIG. 10 (part of which is shown also in FIG. 12) and including the mould of FIG. 11 (which is also shown in FIG. 11) is used to extrude the tubes of the assembly of FIG. 5 from the mixture containing β"-alumina.

The die of FIG. 10 is designated by reference numeral 62 and has a body 64 with a square flat face 66 provided with a multiplicity of twenty-five extrusion orifices 68. Each orifice 68 is in the form of an annulus and the orifices 68 are arranged in a rectangular (square) close-packed arrangement, corresponding to the tube arrangement of FIG. 5, the orifices merging into one another at 70, where they intersect one another.

Figure 11:
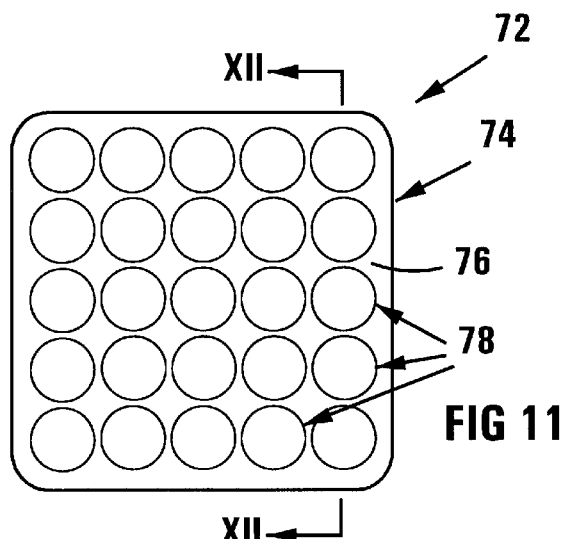
FIG. 11 shows an end elevation of a mould for use with the die of FIG. 10.
Figure 12:
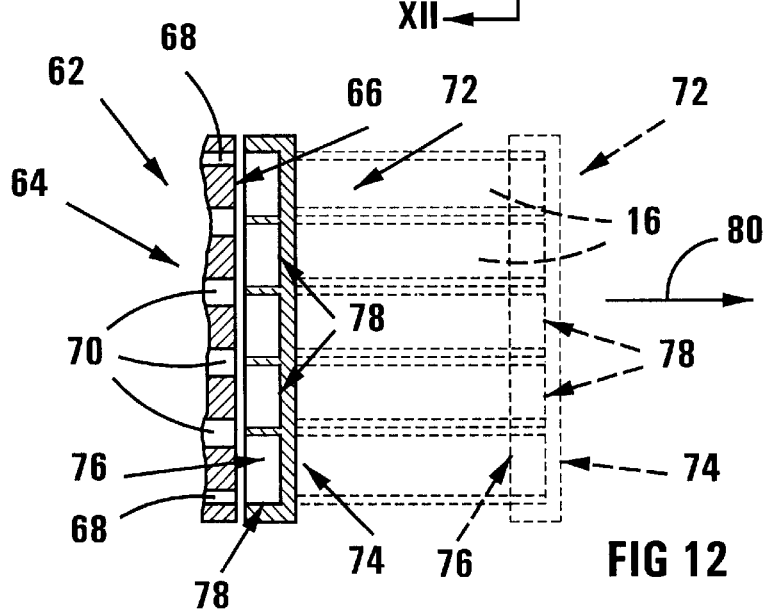
FIG. 12 shows a partial sectional side elevation of the die of FIG. 10 and of the mould of FIG. 11 at the start of an extrusion cycle, in the direction of lines XII—XII in FIGS. 10 and 11.

The mould of FIG. 11 is in turn designated by reference numeral 72 and has a body 74 with a square flat end face 76 in which are provided a multiplicity of twenty-five blind bores in the form of shallow cups 78. The cups 78 are in the same square close-packed arrangement as the orifices 68 of FIG. 10 and are arranged so that, when the die 62 and mould 72 are in face-to-face abutment via their faces 66 and 76 respectively, the cups 78 register respectively with the annular orifices 68 as shown in FIG. 12.

In use, according to the method of the present invention, the extruder having the die 62 is loaded with a batch of the mixture containing the β"-alumina and is used intermittently to extrude green artifacts comprising bundles of tubes 16. At the start of each extrusion cycle the faces 66 and 76 respectively of the die 62 and mould 72 are placed face-to-face in abutment or very closely spaced, and in register as shown in FIG. 12, with the orifices 68 registering with the cups 78. When extrusion is started the mould 72 is kept stationary.

As mixture is extruded from the orifices 68 it enters the registering cups 78 and fills the cups 78. When the cups 78 are full of the mixture, the mould 72 is moved, in the direction of arrow 80, away from the die 62, at a rate corresponding to the rate at which mixture is extruded. The mixture is extruded in the form of a bundle of twenty-five separator tubes 16 in a green state. In this regard it is contemplated that the tubes can be extruded horizontally, as shown in FIG. 11, or indeed possibly vertically, eg upwardly or downwardly, or at an intermediate angle to the horizontal, if this facilities extrusion, depending on the dimensional stability of the green artifact.

When the tubes 16 have been sufficiently extruded to a desired length (see broken lines in FIG. 12), the extrusion is stopped, and the tubes are cut or sliced transversely, at or closely adjacent the face 66 of the die 62, to separate the green artifact from the mixture in the orifices 68 of the die 62. The mould 72 is then, after removal of the green artifact, returned to its starting position, face-to-face with the die 62 at the faces 76 and 66 (solid lines in FIG. 12) after which a further identical extrusion cycle can be carried out. The green artifact will comprise the tube bundle of FIG. 5, with the tubes closed at one end and open at the other, the tube closures 20 having been formed in the cups 78 of the die 72, integral with the tube side walls, as a unitary artifact. The green artifact can then be sintered.

Substantially the same method can be used to make the tube bundles of the assemblies of FIGS. 1–4 and 6–8, using appropriate dies and moulds, suitably modified. Thus, in the case of the bundles of FIGS. 6–8, a mould can be used with a single shallow indentation, into which all the orifices of the associated die discharge at the start of an extrusion cycle, or a selection of recesses and plateaus can be provided on the mould, so that only selected tubes are closed, others being left open.

The mixture containing α-alumina may be separately moulded to form the header 12 (see particularly FIG. 9), which is then sintered, after which the sealing rings 46 and 54 are thermocompression bonded thereto, followed by glassing of the open ends of the tubes 16 in the bundle into the openings 28 of the header 12.

In the case of FIGS. 1–5 the tubes 16 are clearly distinguishable from the spaces 34 between the tubes. It is contemplated that, in use in an electrochemical cell, the tubes 16 will contain an electrochemically active electrode material, such as cathode material or anode material When the tubes 16 contain cathode material the spaces 34 will contain anode material; and when the tubes 16 contain anode material, the spaces 34 will contain cathode material.

In the case of FIGS. 6–8, however, there are no spaces 34. Accordingly, if it is wished to have cathode material in close proximity to anode material spaced therefrom by the solid electrolyte walls of the tubes, some tubes will contain cathode material and others will contain anode material. A possible anode/cathode arrangement is shown in FIG. 7, where tubes containing cathode material are designated 'C' and tubes containing anode material are designated 'A'. In the case of FIG. 8, for example, the larger tubes may contain cathode material, the smaller tubes containing anode material.

In the case of FIGS. 1–5 (and also FIG. 6–8 to which the same considerations apply) all the tubes containing one electrode material (cathode material or anode material as the case may be) will typically open out of into the header 12 and will have their opposite ends, remote from the header, closed by closure panels 20; and all the tubes containing the other electrode material (anode material or cathode material as the case may be) will be open at their ends remote from the header 12, while having their ends adjacent the header 12 closed off by the header floor 22. In the case of FIGS. 6–8 appropriate moulds 72 (FIG. 4) will, as indicated above, be used, and the tubes opening into the header will be glassed to the peripheries of the openings 28 on the lower surface of the floor of the header 12, rather than into the openings 28.

In each case a separator assembly 10 is obtained which makes provision for active anode material to be separated from active cathode material by the walls of the tubes while being in close proximity thereto and in some cases surrounded thereby (FIGS. 2–5). A header 12 is provided for connecting the assembly 10 in place in an electrochemical cell housing with one electrode material in the tubes in communication with the header space 26 and the other electrode material in the spaces between the tubes or in other tubes which are closed off from the header and are in communication, at the end of the tube bundle remote from the header, with a space between the separator assembly 10 and the cell housing. The method of the invention, at least as described with reference to the drawings, provides a convenient and desirable method of mass-producing interconnected tube bundles by extrusion, which after the cutting of the extrusions, can easily be sintered and glassed to headers and tube closures, as desired.

It should be noted that, although in FIG. 9 the lid 42, rim 24 and floor 22 are shown as a unitary moulding, the moulding process required to form this unitary moulding can be complex. Instead, accordingly, it is expected that the lid 42 and the rim 24 will usually be integrally moulded together to form a unitary moulding, the floor 22 being separately moulded or otherwise formed, and, after sintering of the floor 22 and of the moulding comprising the lid 42 and rim 24, the floor 22 being hermetically glassed along its outer periphery to the lower edge of the rim 24.

What is claimed is:

1. A method of making a ceramic solid electrolyte separator for a high temperature electrochemical cell from a particulate starting material capable of being sintered to form a unitary polycrystalline solid electrolyte ceramic artifact, the method including the method steps of:

admixing the particulate starting material with a binder to form an extrudable mixture;

extruding the extrudable mixture to form a unitary sinterable green artifact including a multiplicity of at least five tubes interconnected together in side-by-side relationship; and sintering the green artifact to form a sintered polycrystalline ceramic solid electrolyte artifact including a multiplicity of at least five ceramic solid electrolyte separator tubes interconnected together by sintering and arranged in side-by-side relationship, the method including, after the sintering, hermetically connecting a header to open ends of a plurality of the separator tubes at one end of the separator, the header having an interior in communication with the interiors of these tubes, the hermetic connecting being by glass welding and the header being of a material which is both electronically insulating and electrochemically insulating, and the method further including closing off the ends of a plurality of the separator tubes at the end of the separator remote from the header, closing off the ends of the plurality of tubes at the remote end of the separator being by moulding the ends of said tubes while they are in a green state, to form closures which close off said ends of said tubes, the moulding taking place, prior to the sintering, while the separator is being extruded, the moulding being by means of a mould having a multiplicity of recesses, there being a recess for each tube of the green artifact, the mould being aligned with the tubes during the extrusion so that each tube registers with a corresponding one of the recesses, the extrusion of the tubes being into the recesses so that the leading ends of the tubes are received in the recesses and are closed off by being moulded shut by contact with inner surfaces of the recesses.

2. A method as claimed in claim 1, in which the particulate starting material is a precursor of a solid electrolyte selected from the group of solid electrolytes consisting of sodium β-alumina, sodium β"-alumina and mixtures thereof, the binder being selected from the group consisting of binders having thermoplastic properties, binders having thermosetting properties, binders having both thermoplastic properties and thermosetting properties, and mixtures of such binders.

3. A method as claimed in claim 1, in which the extruding acts to provide the tubes of the green artifact in a close-packed side-by-side abutting relationship in which the peripheries of adjacent tubes abut one another and, after the sintering, are integral with one another.

4. A method as claimed in claim 1, in which the extruding acts to provide the tubes of the green artifact in a mutually spaced side-by-side relationship, the tubes being spaced apart from one another by longitudinally extending spacers in the form of webs of extruded material, each web having side edges integral with the peripheries of two adjacent tubes.

5. A method as claimed in claim 1, in which the extruding is intermittent, being of a plurality of unitary sinterable green artifacts in succession from a batch of the extrudable mixture, a plurality of the green artifacts being sintered simultaneously in a single sintering step.

6. A method as claimed in claim 1, in which the tubes are extruded from a batch of the extrudable mixture into the recesses at the start of each extrusion step, with the mould stationary and located in a starting position until the tubes are moulded shut, the mould then being moved away from the starting position in the direction in which the tubes are extruded, until the tubes are fully extruded, the green artifact then being detached from the unextruded remainder of the batch, and the mould then being returned to the starting position.

* * * * *